UNITED STATES PATENT OFFICE.

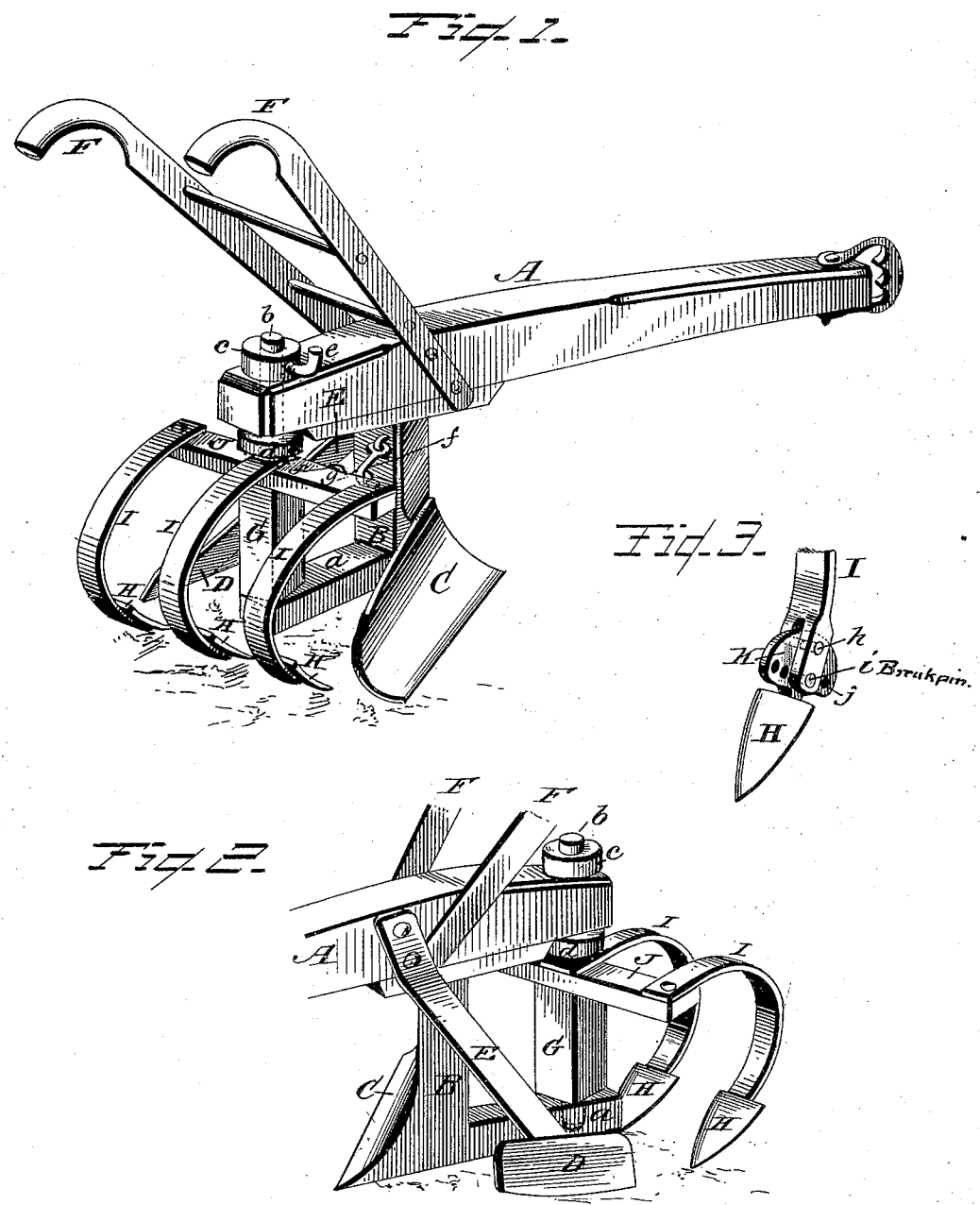

RICHARD S. BONNER, OF LITTLE ROCK, ARKANSAS.

CULTIVATOR ATTACHMENT FOR PLOWS.

SPECIFICATION forming part of Letters Patent No. 690,921, dated January 14, 1902.

Application filed August 14, 1901. Serial No. 71,977. (No model.)

*To all whom it may concern:*

Be it known that I, RICHARD S. BONNER, a citizen of the United States, residing at Little Rock, in the county of Pulaski and State of Arkansas, have invented certain new and useful Improvements in Cultivator Attachments for Plows; and I do hereby declare that the following is a full, clear, and exact description of the same, reference being had to the annexed drawings, making a part of this specification, and to the letters of reference marked thereon.

The present invention has for its object to provide a cultivator attachment for plows that will be simple in construction, effective in operation, and admitting of the attachment to be set at any desired angle to suit the convenience of the farmer and adapt it to the various forms of plows.

The invention consists of a plow with the cultivator attachment constructed substantially as shown in the drawings and hereinafter described and claimed.

Figure 1 of the drawings is a perspective view of a plow embodying my invention; Fig. 2, a perspective view of the end of the plow, showing the reverse side to that of Fig. 1. Fig. 3 is a detail perspective view showing a modification in the manner of connecting the shovel to its bar or support.

In the accompanying drawings, A represents the plow-beam, provided with the usual standard B, to which is connected the scraper C, disposed at the necessary angle, as shown, to run as close to the cotton as possible in doing perfect work without choking. Upon the opposite side of the plow-standard B is connected the fender D by which, in connection with the scraper, small crops may be scraped and the dirt thrown to it with one and the same operation.

I do not wish to be understood as limiting my invention to any particular form of scraper or fender or plow-beam or standard, as many changes or modifications may be made therein without departing from the principle of my invention or in any manner affecting the successful operation thereof.

The fender D is connected to a spring-arm E, which arm in turn is connected to the plow-beam, and suitable handles F are secured to the beam in any convenient manner.

The cultivator attachment comprises the upright support G, which is pivotally connected between and to the rear end of the plow-beam A and the step $a$ of the standard B. This support G terminates at its ends in pivot-pins to engage holes in the beam and step. The upper one of said pins, as shown at $b$, is of increased length and extends some distance above the beam. The pivot-pins are the extremities of a continuous rod extending axially through the support G and removable therefrom when it is desired to regulate the height of the cultivator-shovels. Two washers or nuts $c$ $d$ engage with the pin $b$, one of said nuts having a set-screw $e$ to hold it on the pin, the cultivator-shovels, as shown at H, being connected in the usual manner to the bars I, and said bars in turn are secured to the cross-head J, which connects with the support G. The washers or nuts $c$ $d$ are preferably of different thicknesses and are provided with screw-holes to receive a suitable set-screw $e$ to hold the upper one of said washers or nuts upon the pivot-pin $b$, which in the present instance is the washer or nut $c$. The purpose of these two washers or nuts is to raise or lower the cross-head J, and thereby regulate the height of the cultivator-shovels H with relation to the ground.

Should it be desired to elevate the position of the cross-head J from the position shown in Fig. 1 of the drawings, the set-screw $e$ is loosened sufficiently to admit the removal of the washer or nut $c$, after which the rod, whose extremities form the pivot-pins of the support G, is withdrawn and also the cross-head and the washer or nut $d$. The washer or nut $c$ is now placed upon the upper end of the support G and the cross-head J replaced, after which the rod which forms the pivot-pins of the support is also replaced and the washer or nut $d$ secured to the end of the pivot-pin by means of the set-screw $e$. It should be understood that the space between the upper end of the support G and the under side of the rear end of the plow-beam A is sufficient to admit the substitution of the washer $c$ in place of the washer $d$ when it is desired to elevate the cross-head J. The washer $c$, which has the greatest thickness, will now rest under the cross-head J and elevate said cross-head the distance of the thickness of the washer or nut and raise the cultivator-shovels H their greatest height to adapt the shovels to circumstances as may be required.

The adjustment of the washers or nuts as above described will raise the cultivator-shovels their greatest limit, but should a slight elevation only be required from the position shown in Fig. 1 of the drawings the washer or nut d may be placed under the cross-head J instead of above it.

The employment of the washers or nuts, which are both removable and adjustable, enables the cultivator-shovels to be regulated in height with relation to the ground in a perfect and expeditious manner with comparatively little expense in the construction of the attachment. Other means, however, may be substituted for the washers or nuts as a means of regulating the height of the cultivator-shovels, as I do not desire to be confined to the exact means shown.

The support G being pivotally connected to its bearings and carrying the cultivator, said cultivator is capable of adjustment laterally at any angle desired and held in its adjusted position by any preferred means, such as a hook f engaging one of a number of eyes g on the cross-head J.

Any suitable means may be used for holding the cultivator to the angle to which it has been adjusted, thereby adapting the attachment to any kind or form of plow and also to suit the convenience of the farmer.

A very practical and easily-operating plow with cultivator attachment is provided by the construction hereinbefore described and one that may be successfully operated in any and all kinds of soil without choking, and the attachment to the plow being capable of adjustment vertically to set the shovels deep or shallow and also horizontally on the arc of a circle materially enhances the value of the plow and enables it to adapt itself to the various classes of work to which it may be used.

In place of rigidly connecting the shovels H to the bars I the shovels may be connected to the bars as shown in Fig. 3 of the drawings. In this form the shovels are provided with a segmental plate K, with holes j, pivotally connected to the bars, as shown at h, but held against pivotal action by means of a wooden key i or of such material that will easily break to release the shovel should the same come against any obstruction that would tend to injure it, and thus allow the shovel to pass over the obstruction.

Having now fully described my invention, what I claim as new, and desire to secure by Letters Patent, is—

1. A cultivator attachment for plows, comprising an upright support connected to the rear end thereof, a cross-head with cultivator-shovels connected to the support, said cross-head being both vertically adjustable and adjustable horizontally in the arc of a circle, and suitable means for holding said cross-head in its adjusted positions, substantially as and for the purpose set forth.

2. A cultivator attachment for plows, comprising an upright support pivotally connected to and between the rear end of the plow-beam and a suitable step projecting from the plow, a cross-head carrying suitable cultivator-shovels and pivotally connected to the support, said cross-head being both vertically adjustable and adjustable horizontally on the arc of a circle, and means for holding the cross-head in its adjusted positions, substantially as and for the purpose described.

3. A cultivator attachment for plows, comprising a suitable support connected to the rear end of the plow, a cross-head carrying cultivator-shovels, said cross-head being vertically adjustable, and removable and adjustable washers or nuts to hold the cross-head in its adjusted position, substantially as and for the purpose specified.

In testimony that I claim the above I have hereunto subscribed my name in the presence of two witnesses.

RICHARD S. BONNER.

Witnesses:
 ED. CORNISH,
 J. E. ENGLAND, Jr.